United States Patent
Shamoto et al.

(10) Patent No.: US 10,029,635 B2
(45) Date of Patent: Jul. 24, 2018

(54) VEHICLE FRONT PORTION STRUCTURE EQUIPPED WITH PEDESTRIAN COLLISION DETECTING SENSOR

(71) Applicant: TOYOTA JIDOSHA KABUSHIKI KAISHA, Toyota-shi, Aichi-ken (JP)

(72) Inventors: Takehisa Shamoto, Toyota (JP); Naoya Higashimachi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/302,009

(22) PCT Filed: May 11, 2015

(86) PCT No.: PCT/JP2015/063518
§ 371 (c)(1),
(2) Date: Oct. 5, 2016

(87) PCT Pub. No.: WO2015/186477
PCT Pub. Date: Dec. 10, 2015

(65) Prior Publication Data
US 2017/0144619 A1 May 25, 2017

(30) Foreign Application Priority Data
Jun. 2, 2014 (JP) .................................. 2014-114141

(51) Int. Cl.
*B60R 19/18* (2006.01)
*B60R 19/48* (2006.01)
(Continued)

(52) U.S. Cl.
CPC .......... *B60R 19/483* (2013.01); *B60R 19/023* (2013.01); *B60R 19/04* (2013.01);
(Continued)

(58) Field of Classification Search
CPC .................. B60R 19/483; B60R 19/18; B60R 2019/1866; B60R 2019/04; B60R 2019/48
(Continued)

(56) References Cited

U.S. PATENT DOCUMENTS

2008/0122231 A1* 5/2008 Schinke .............. B60R 21/0136
293/117
2008/0315598 A1* 12/2008 Takafuji ................ B60R 19/483
293/117
(Continued)

FOREIGN PATENT DOCUMENTS

DE 102013017415 A1 * 7/2014 ........... B60R 19/483
JP 2007-069707 A 3/2007
(Continued)

*Primary Examiner* — Pinel E Romain
(74) *Attorney, Agent, or Firm* — Oliff PLC

(57) ABSTRACT

At a front bumper, a supporting member is mounted to a bent portion of a bumper RF, and the supporting member extends-out toward a vehicle transverse direction outer side from the bumper RF. Therefore, when a pressure tube is pressed at a time of a collision of a collision body with a vehicle corner portion, reaction force is applied from the supporting member to the pressure tube, and the pressure tube deforms. Due thereto, a collision with a collision body can be detected. Here, when load of a predetermined value or greater is inputted to the supporting member from a rear side, the supporting member separates from the bumper RF. Therefore, in a damage test, when the supporting member interferes with a sub-radiator that is at a vehicle rear side of the supporting member, the supporting member can be made to separate from the bumper RF.

12 Claims, 8 Drawing Sheets

(51) Int. Cl.
*B60R 19/02* (2006.01)
*B60R 19/04* (2006.01)
*B60R 19/24* (2006.01)

(52) U.S. Cl.
CPC .............. *B60R 19/18* (2013.01); *B60R 19/24* (2013.01); *B60R 19/48* (2013.01); *B60R 2019/186* (2013.01)

(58) Field of Classification Search
USPC ........................................................ 293/117
See application file for complete search history.

(56) References Cited

U.S. PATENT DOCUMENTS

| | | | |
|---|---|---|---|
| 2009/0108598 A1 | 4/2009 | Takahashi | |
| 2009/0160204 A1 | 6/2009 | Czopek et al. | |
| 2013/0127190 A1 | 5/2013 | Shamoto | |
| 2016/0009237 A1* | 1/2016 | Rahe | B60R 19/12 293/4 |
| 2016/0209283 A1* | 7/2016 | Walz | B60R 21/0136 |
| 2016/0288750 A1* | 10/2016 | Nickel | B60R 19/483 |
| 2016/0347270 A1* | 12/2016 | Higashimachi | B60R 19/04 |

FOREIGN PATENT DOCUMENTS

| | | | | |
|---|---|---|---|---|
| JP | 2010-047110 A | 3/2010 | | |
| JP | 2011-126399 A | 6/2011 | | |
| JP | 2011-245910 A | 12/2011 | | |
| JP | 2015-030323 A | 2/2015 | | |
| JP | 2015-150906 A | 8/2015 | | |
| JP | 2015150906 A | * | 8/2015 | ............ B60R 19/04 |
| KR | 2010-0093056 A | 8/2010 | | |
| WO | 2011/128971 A1 | 10/2011 | | |
| WO | 2012/113362 A1 | 8/2012 | | |

\* cited by examiner

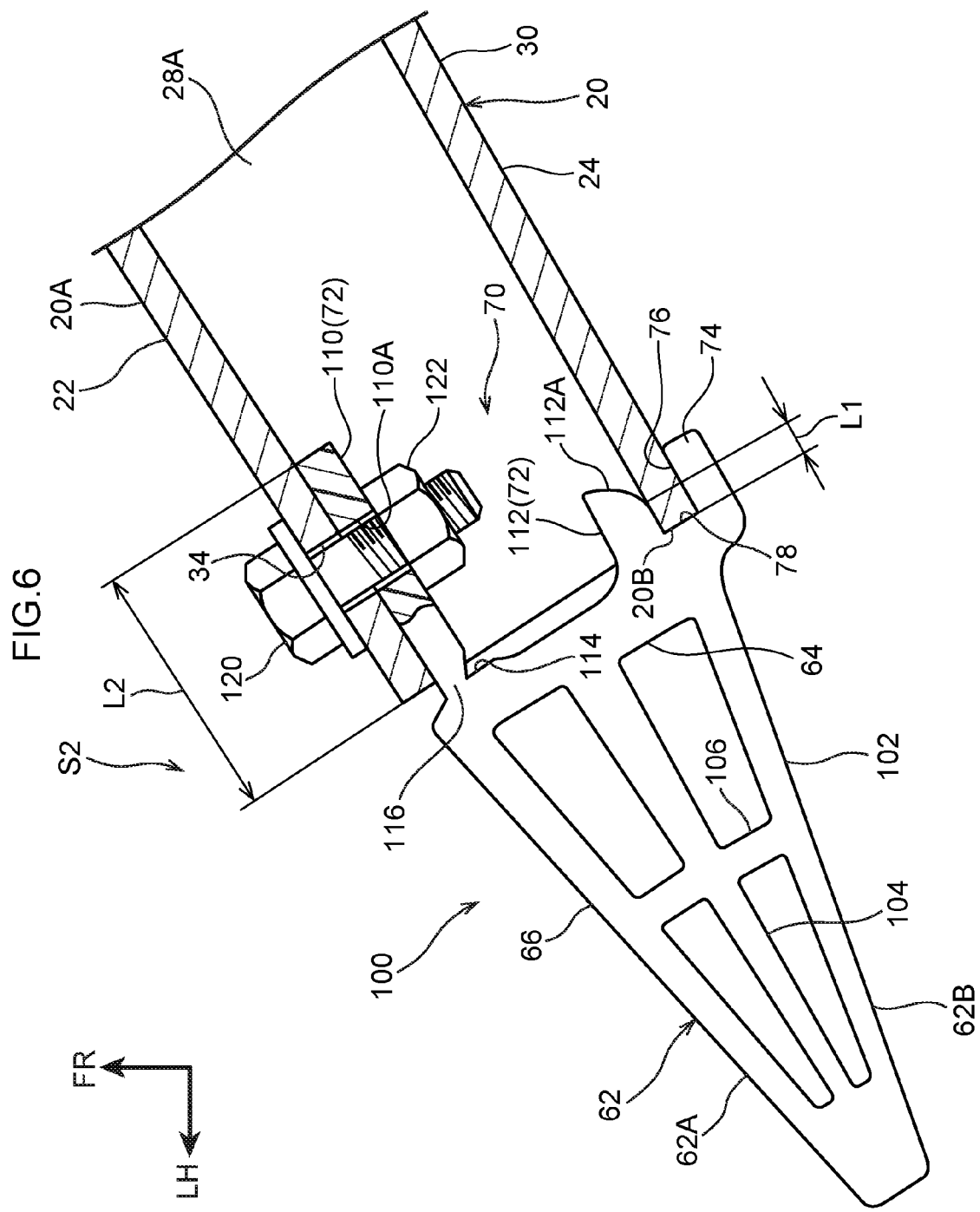

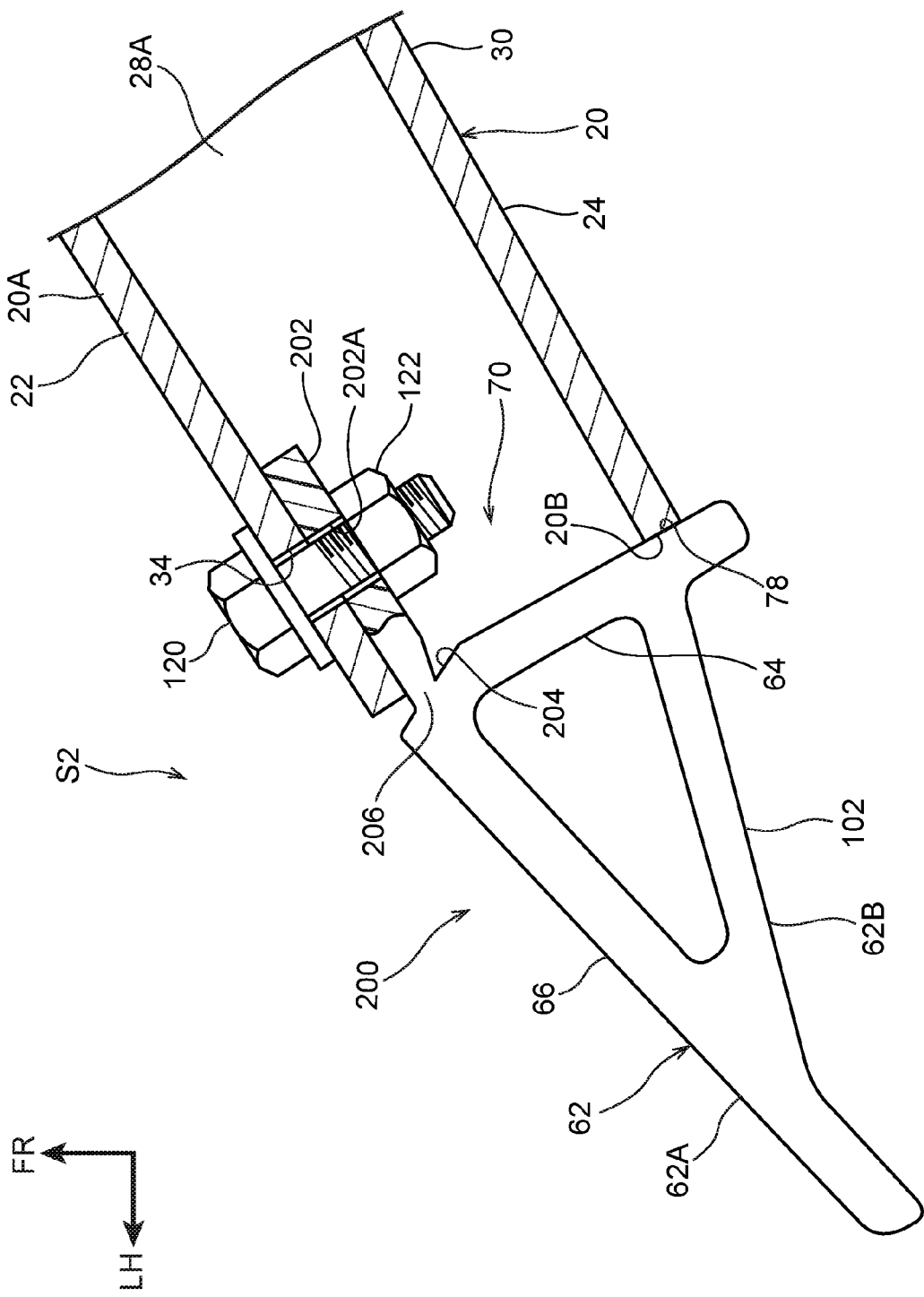

VEHICLE FRONT PORTION STRUCTURE EQUIPPED WITH PEDESTRIAN COLLISION DETECTING SENSOR

TECHNICAL FIELD

The present invention relates to a vehicle front portion structure that is equipped with a pedestrian collision detecting sensor.

BACKGROUND ART

In the vehicle front portion structure that is equipped with a pedestrian collision detecting sensor and is disclosed in following Patent Document 1, a bumper reinforcement that extends in the vehicle transverse direction is structured by a general portion and corner portions (portions that are disposed further toward the vehicle transverse direction outer sides than the crash boxes). Further, the rigidity at the corner portions is set to be low as compared with the rigidity at the general portion. Further, a pressure chamber (pressure sensor member) is provided at the vehicle front side of the bumper reinforcement. Further, when the leg portion of a pedestrian collides with a corner portion side of the bumper reinforcement, that corner portion deforms. Due thereto, the impact energy with respect to the pedestrian can be absorbed. Further, by making the corner portions have low rigidity, lightening of the weight of the vehicle can be devised. Accordingly, in the above-described vehicle front portion structure that is equipped with a pedestrian collision detecting sensor, even in a case in which the detection area of the pressure bumper is enlarged toward the vehicle transverse direction outer sides, the pedestrian protecting performance can be improved while a lightening of the weight of the vehicle is devised. Note that, as vehicle front portion structures that are equipped with a pedestrian collision detecting sensor, there are, in addition, the structures disclosed in following Patent Document 2 through Patent Document 4.

PRIOR ART DOCUMENTS

Patent Documents

Patent Document 1: Japanese Patent Application Laid-Open (JP-A) No. 2011-245910
Patent Document 2: JP-A No. 2007-069707
Patent Document 3: International Publication No. 2011/128971
Patent Document 4: International Publication No. 2012/113362

SUMMARY OF THE INVENTION

Technical Problem

However, in the above-described vehicle front portion structure that is equipped with a pedestrian collision detecting sensor, there are the following matters of concern in damage tests in which a barrier is made to collide with a vehicle transverse direction outer side end portion of a vehicle from the front side. Namely, when a barrier collides with the vehicle in a damage test, accompanying the penetration of the barrier into the vehicle, the bumper reinforcement is displaced toward the vehicle rear side. At this time, the corner portion interferes with a peripheral part (e.g., the sub-radiator or the like) that is disposed at the vehicle rear side of that corner portion of the bumper reinforcement, and there is the concern that the peripheral part will be damaged. Therefore, there is the concern that damageability with respect to peripheral parts will deteriorate.

In regard thereto, if the corner portions are omitted at the bumper reinforcement, the detection area of the pressure chamber cannot be enlarged toward the vehicle transverse direction outer sides. Namely, collisions with collision bodies at the corner portions of the vehicle cannot be detected.

In view of the above-described circumstances, an object of the present invention is to provide a vehicle front portion structure that is equipped with a pedestrian collision detecting sensor, that can detect collisions with collision bodies at corner portions of a vehicle, while improving the damageability with respect to peripheral parts.

Solution to Problem

A vehicle front portion structure that is equipped with a pedestrian collision detecting sensor and that relates to a first aspect comprises: a bumper reinforcement whose length direction is a vehicle transverse direction; a pedestrian collision detecting sensor that is structured to include a pressure sensor member, that is adjacent to a vehicle front side of the bumper reinforcement and extends in the vehicle transverse direction, and that outputs a signal corresponding to a change in pressure of the pressure sensor member; and a supporting member that is mounted to a vehicle transverse direction outer side end portion of the bumper reinforcement, and that extends from the bumper reinforcement toward a vehicle transverse direction outer side, and that supports the pressure sensor member from a vehicle rear side with respect to load from a vehicle front side, and that separates from the bumper reinforcement when load of a predetermined value or greater is inputted from a vehicle rear side.

In accordance with the above-described structure, the bumper reinforcement is disposed with the length direction thereof being the vehicle transverse direction. The pressure sensor member of the pedestrian collision detecting sensor is disposed adjacent to the vehicle front side of this bumper reinforcement, and the pressure sensor member extends in the vehicle transverse direction.

Further, the supporting member is mounted to the vehicle transverse outer side end portion of the bumper reinforcement, and the supporting member extends from the bumper reinforcement toward the vehicle transverse direction outer side. Further, the supporting member supports the pressure sensor member from the vehicle rear side with respect to load from the vehicle front side. Therefore, when the pressure sensor member is pushed toward the vehicle rear side at the time of a collision of a collision body with a vehicle corner portion, reaction force is applied to the pressure sensor member from the supporting member, and the pressure sensor member deforms. Due thereto, a signal corresponding to the change in pressure of the pressure sensor member is outputted from the pedestrian collision detecting sensor, and a collision with a collision body can be detected at the corner portion of the vehicle.

Here, when load of a predetermined value or greater is inputted to the supporting member from the vehicle rear side, the supporting member separates from the bumper reinforcement. Therefore, in a damage test, when the bumper reinforcement is displaced toward the vehicle rear side by a barrier that penetrates into the vehicle from the vehicle front side, and the supporting member interferes with a peripheral part that is disposed at the vehicle rear side of the supporting member, the supporting member can be made to separate from the bumper reinforcement. Due thereto, damage to the peripheral part can be suppressed or prevented. As a result, the damageability with respect to the peripheral part can be improved.

In a vehicle front portion structure that is equipped with a pedestrian collision detecting sensor and that relates to a second aspect, in the vehicle front portion structure that is equipped with a pedestrian collision detecting sensor and that relates to the first aspect, the supporting member has a supporting main body portion that extends toward a vehicle transverse direction outer side from the bumper reinforcement, and a mounting mechanism portion that is mounted to the vehicle transverse direction outer side end portion of the bumper reinforcement and maintains a mounted posture of the supporting main body portion, and, when load of a predetermined value or greater is inputted to the supporting main body portion from a vehicle rear side, maintaining of the mounted posture of the supporting main body portion by the mounting mechanism portion is cancelled, and the supporting main body portion is displaced toward a vehicle front side.

In accordance with the above-described structure, the supporting member has a supporting main body portion and a mounting mechanism portion. Further, the mounting mechanism portion is mounted to the vehicle transverse direction outer side end portion of the bumper reinforcement, and the supporting main body portion extends from the bumper reinforcement toward the vehicle transverse direction outer side, and the mounted posture of the supporting main body portion is maintained.

Here, when load of a predetermined value or greater is inputted to the supporting main body portion from the vehicle rear side, the maintaining of the mounted posture of the supporting main body portion by the mounting mechanism portion is cancelled, and the supporting main body portion is displaced toward the vehicle front side. Therefore, for example, by appropriately setting the mounting strength of the mounting mechanism portion with respect to load from the vehicle rear side, when load of a predetermined value or greater is inputted from the vehicle rear side to the supporting main body portion, the mounted state of the mounting mechanism portion with respect to the bumper reinforcement is cancelled, and the supporting main body portion can be displaced toward the vehicle front side. Further, for example, by appropriately setting the strength of the supporting member itself with respect to load from the vehicle rear side, when load of a predetermined value or greater is inputted to the supporting main body portion from the vehicle rear side, the supporting member is bendingly deformed, and the supporting main body portion can be displaced toward the vehicle front side.

In a vehicle front portion structure that is equipped with a pedestrian collision detecting sensor and that relates to a third aspect, in the vehicle front portion structure that is equipped with a pedestrian collision detecting sensor and that relates to the second aspect, the bumper reinforcement is formed in a hollow shape that opens toward a vehicle transverse direction outer side, the mounting mechanism portion has a fit-together portion that is fit-together with the bumper reinforcement interior, and a fit-together length of the fit-together portion and a rear wall portion of the bumper reinforcement is set to be short as compared with a fit-together length of the fit-together portion and a front wall portion of the bumper reinforcement.

In accordance with the above-described structure, when load from the vehicle front side is inputted to the supporting main body portion, the supporting member starts to pivot with the vehicle transverse direction outer side end of the bumper reinforcement being the fulcrum as seen in plan view, such that the supporting main body portion is displaced toward the vehicle rear side and the fit-together portion is displaced toward the vehicle front side. On the other hand, when load from the vehicle rear side is inputted to the supporting main body portion, the supporting member starts to pivot with the vehicle transverse direction outer side end of the bumper reinforcement being the fulcrum as seen in plan view, such that the supporting main body portion is displaced toward the vehicle front side and the fit-together portion is displaced toward the vehicle rear side.

Here, the fit-together length of the fit-together portion and the rear wall portion of the bumper reinforcement is set to be short as compared with the fit-together length of the fit-together portion and the front wall portion of the bumper reinforcement. Therefore, by appropriately setting the fit-together length of the fit-together portion and the front wall portion of the bumper reinforcement, the fit-together state of the fit-together portion and the bumper reinforcement can be maintained with respect to load from the vehicle front side. On the other hand, by appropriately setting the fit-together length of the fit-together portion and the rear wall portion of the bumper reinforcement, the fit-together state of the fit-together portion and the bumper reinforcement can be cancelled with respect to load from the vehicle rear side. Due thereto, even in a case in which the supporting member is provided at the bumper reinforcement in order to enlarge the range of detection at the pedestrian collision detecting sensor, an improvement in damageability with respect to peripheral parts can be realized by a simple structure.

In a vehicle front portion structure that is equipped with a pedestrian collision detecting sensor and that relates to a fourth aspect, in the vehicle front portion structure that is equipped with a pedestrian collision detecting sensor and that relates to the third aspect, the fit-together portion is fixed by a fastening member to the front wall portion of the bumper reinforcement, and the supporting member bendingly deforms when load of a predetermined value or greater is inputted to the supporting main body portion from a vehicle rear side.

In accordance with the above-described structure, the fit-together portion is fixed to the front wall portion of the bumper reinforcement by the fastening member. Therefore, the mounted state of the supporting member can be stabilized.

On the other hand, when load of a predetermined value or greater is inputted to the supporting main body portion from the vehicle rear side, the supporting member bendingly deforms. Therefore, even in a case in which the fit-together portion of the supporting member is fixed to the bumper reinforcement by the fastening member, due to the supporting member being bendingly deformed at the time of interference between the supporting main body portion and a peripheral part, damage to the peripheral part can be suppressed or prevented. Accordingly, damage to peripheral parts can be suppressed or prevented while the mounted state of the supporting member is stabilized.

In a vehicle front portion structure that is equipped with a pedestrian collision detecting sensor and that relates to a fifth aspect, in the vehicle front portion structure that is equipped with a pedestrian collision detecting sensor and that relates to the fourth aspect, a bending starting point portion that is a starting point of bending deformation is formed at the fit-together portion.

In accordance with the above-described structure, because the bending starting point portion, that is the starting point of the bending deformation of the supporting member, is formed at the fit-together portion, the supporting member can be bendingly deformed stably when load of a predetermined value or greater is inputted to the supporting member from the vehicle rear side.

In a vehicle front portion structure that is equipped with a pedestrian collision detecting sensor and that relates to a sixth aspect, in the vehicle front portion structure that is equipped with a pedestrian collision detecting sensor and that relates to any one of the second aspect through the fifth aspect, the mounting mechanism portion has a groove portion that opens toward a vehicle transverse direction inner side as seen in plan view, and a rear wall portion of the bumper reinforcement is fit-into the groove portion interior.

In accordance with the above-described structure, the groove portion of the mounting mechanism portion opens toward the vehicle transverse direction inner side as seen in plan view, and the rear wall portion of the bumper reinforcement is fit-in this groove portion. Further, as described above, when load from the vehicle front side is inputted to the supporting main body portion, the supporting member starts to pivot with the vehicle transverse direction outer side end of the bumper reinforcement being the fulcrum as seen in plan view, such that the supporting main body portion is displaced toward the vehicle rear side and the fit-together portion is displaced toward the vehicle front side. At this time, the inner peripheral surface of the groove portion can be made to abut the rear wall portion of the bumper reinforcement. Due thereto, relative pivoting of the supporting member with respect to the bumper reinforcement at the time when load from the vehicle front side is inputted to the supporting main body portion is suppressed more, and therefore, the supporting performance of the supporting member with respect to the pressure sensor member can be improved more.

In a vehicle front portion structure that is equipped with a pedestrian collision detecting sensor and that relates to a seventh aspect, in the vehicle front portion structure that is equipped with a pedestrian collision detecting sensor and that relates to any one of the third aspect through the sixth aspect, an engaging portion, that is engaged with an engaged portion formed at the bumper reinforcement, is provided at the supporting member, and movement of the supporting member toward a vehicle transverse direction outer side is limited due to the engaging portion being engaged with the engaged portion.

In accordance with the above-described structure, due to the engaging portion and the engaged portion being engaged, movement of the supporting member toward the vehicle transverse direction outer side, after mounting of the supporting member to the bumper reinforcement, can be limited.

In a vehicle front portion structure that is equipped with a pedestrian collision detecting sensor and that relates to an eighth aspect, in the vehicle front portion structure that is equipped with a pedestrian collision detecting sensor and that relates to the second aspect, the bumper reinforcement is formed in a hollow shape that opens toward a vehicle transverse direction outer side, the mounting mechanism portion is structured to include an abutting portion, that is structured so as to be able to abut a vehicle transverse direction outer side end surface at a rear wall portion of the bumper reinforcement, and a fixed portion, that is fixed by a fastening member to a front wall portion of the bumper reinforcement at the bumper reinforcement interior, and the supporting member bendingly deforms when load of a predetermined value or greater is inputted to the supporting main body portion from a vehicle rear side.

In accordance with the above-described structure, because the fixed portion is fixed to the front wall portion of the bumper reinforcement by the fastening member, the mounted state of the supporting member can be stabilized.

Further, when load from the vehicle front side is inputted to the supporting main body portion, the supporting member starts to pivot with the vehicle transverse direction outer side end of the bumper reinforcement being the fulcrum as seen in plan view, such that the supporting main body portion is displaced toward the vehicle rear side and the fit-together portion is displaced toward the vehicle front side. At this time, the abutting portion of the mounting mechanism portion is supported by that end surface at the rear wall portion of the bumper reinforcement. Due thereto, the pressure sensor member can be supported well by the supporting member with respect to load from the vehicle front side.

On the other hand, when load of a predetermined value or greater is inputted to the supporting main body portion from the vehicle rear side, the supporting member bendingly deforms, and the supporting main body portion is displaced toward the vehicle front side. Therefore, even in a case in which the fixed portion of the supporting member is fixed by the fastening member to the bumper reinforcement, due to the supporting member being bendingly deformed at the time of interference between the supporting main body portion and a peripheral part, damage to the peripheral part can be suppressed or prevented. Accordingly, damage to peripheral parts can be suppressed or prevented while the mounted state of the supporting member is stabilized.

In a vehicle front portion structure that is equipped with a pedestrian collision detecting sensor and that relates to a ninth aspect, in the vehicle front portion structure that is equipped with a pedestrian collision detecting sensor and that relates to the eighth aspect, a bending starting point portion that is a starting point of bending deformation is formed at the fixed portion.

In accordance with the above-described structure, because the bending starting point portion, that is the starting point of the bending deformation of the supporting member, is formed at the fixed portion, the supporting member can be bendingly deformed stably when load of a predetermined value or greater is inputted to the supporting main body portion from the vehicle rear side.

In a vehicle front portion structure that is equipped with a pedestrian collision detecting sensor and that relates to a tenth aspect, in the vehicle front portion structure that is equipped with a pedestrian collision detecting sensor and that relates to any one of the second aspect through the ninth aspect, a width dimension, in a vehicle longitudinal direction, of the supporting main body portion is set so as to become smaller toward a vehicle transverse direction outer side.

In accordance with the above-described structure, because the width dimension of the supporting main body portion in the vehicle longitudinal direction is set so as to become smaller toward the vehicle transverse direction outer side, the setting space of the supporting main body portion becoming large can be suppressed.

In a vehicle front portion structure that is equipped with a pedestrian collision detecting sensor and that relates to an eleventh aspect, in the vehicle front portion structure that is equipped with a pedestrian collision detecting sensor and that relates to any one of the second aspect through the tenth aspect, a recessed portion that opens toward a vehicle rear side as seen in plan view is formed at a rear surface of the supporting main body portion.

In accordance with the above-described structure, when the supporting member is displaced toward the vehicle rear side in a damage test for example, the supporting main body portion hitting parts other than the aforementioned peripheral part can be suppressed.

In a vehicle front portion structure that is equipped with a pedestrian collision detecting sensor and that relates to a twelfth aspect, in the vehicle front portion structure that is equipped with a pedestrian collision detecting sensor and that relates to any one of the second aspect through the eleventh aspect, a reinforcing rib, that makes a bending rigidity of the supporting main body portion in a vehicle longitudinal direction high, is formed at the supporting main body portion.

In accordance with the above-described structure, because the bending rigidity of the supporting main body portion in the vehicle longitudinal direction is made to be high by the reinforcing rib, flexural deformation and the like of the supporting main body portion when load from the vehicle front side is applied to the supporting main body portion can be suppressed. Due thereto, when load from the vehicle front side is inputted to the supporting member, reaction force with respect to this load can be applied efficiently. Accordingly, the detection accuracy of the pedestrian collision detecting sensor can be made to be high.

Advantageous Effects of Invention

In accordance with the vehicle front portion structures that are equipped with a pedestrian collision detecting sensor and relate to the first aspect and the second aspect, a collision with a collision body at a corner portion of the vehicle can be detected while the damageability with respect to peripheral parts is improved.

In accordance with the vehicle front portion structure that is equipped with a pedestrian collision detecting sensor and relates to the third aspect, an improvement in damageability with respect to peripheral parts can be realized by a simple structure.

In accordance with the vehicle front portion structure that is equipped with a pedestrian collision detecting sensor and relates to the fourth aspect, damage to peripheral parts can be suppressed or prevented while the mounted state of the supporting member is stabilized.

In accordance with the vehicle front portion structure that is equipped with a pedestrian collision detecting sensor and relates to the fifth aspect, the supporting member can be bendingly deformed stably at the time of interference between the supporting member and a peripheral part.

In accordance with the vehicle front portion structure that is equipped with a pedestrian collision detecting sensor and relates to the sixth aspect, the supporting performance of the supporting member with respect to the pressure sensor member can be improved more.

In accordance with the vehicle front portion structure that is equipped with a pedestrian collision detecting sensor and relates to the seventh aspect, movement of the supporting member toward the vehicle transverse direction outer side, after mounting of the supporting member to the bumper reinforcement, can be limited.

In accordance with the vehicle front portion structure that is equipped with a pedestrian collision detecting sensor and relates to the eighth aspect, damage to peripheral parts can be suppressed or prevented while the mounted state of the supporting member is stabilized.

In accordance with the vehicle front portion structure that is equipped with a pedestrian collision detecting sensor and relates to the ninth aspect, the supporting member can be bendingly deformed stably at the time of interference between the supporting member and a peripheral part.

In accordance with the vehicle front portion structure that is equipped with a pedestrian collision detecting sensor and relates to the tenth aspect, the setting space of the supporting main body portion becoming large can be suppressed.

In accordance with the vehicle front portion structure that is equipped with a pedestrian collision detecting sensor and relates to the eleventh aspect, when the supporting member is displaced toward the vehicle rear side in a damage test for example, the supporting main body portion hitting parts other than the peripheral part can be suppressed.

In accordance with the vehicle front portion structure that is equipped with a pedestrian collision detecting sensor and relates to the twelfth aspect, the detection accuracy of the pedestrian collision detecting sensor can be made to be high.

BRIEF DESCRIPTION OF DRAWINGS

FIG. 6 is a plan sectional view that corresponds to FIG. 1 and that illustrates the vehicle left side end portion of the bumper reinforcement at the front bumper to which is applied a vehicle front portion structure that is equipped with a pedestrian collision detecting sensor and relates to a second embodiment.

FIG. 7 is a plan sectional view that corresponds to FIG. 1 and that illustrates the vehicle left side end portion of the bumper reinforcement at the front bumper to which is applied a vehicle front portion structure that is equipped with a pedestrian collision detecting sensor and relates to a third embodiment.

DESCRIPTION OF EMBODIMENTS

First Embodiment

Figure 1:
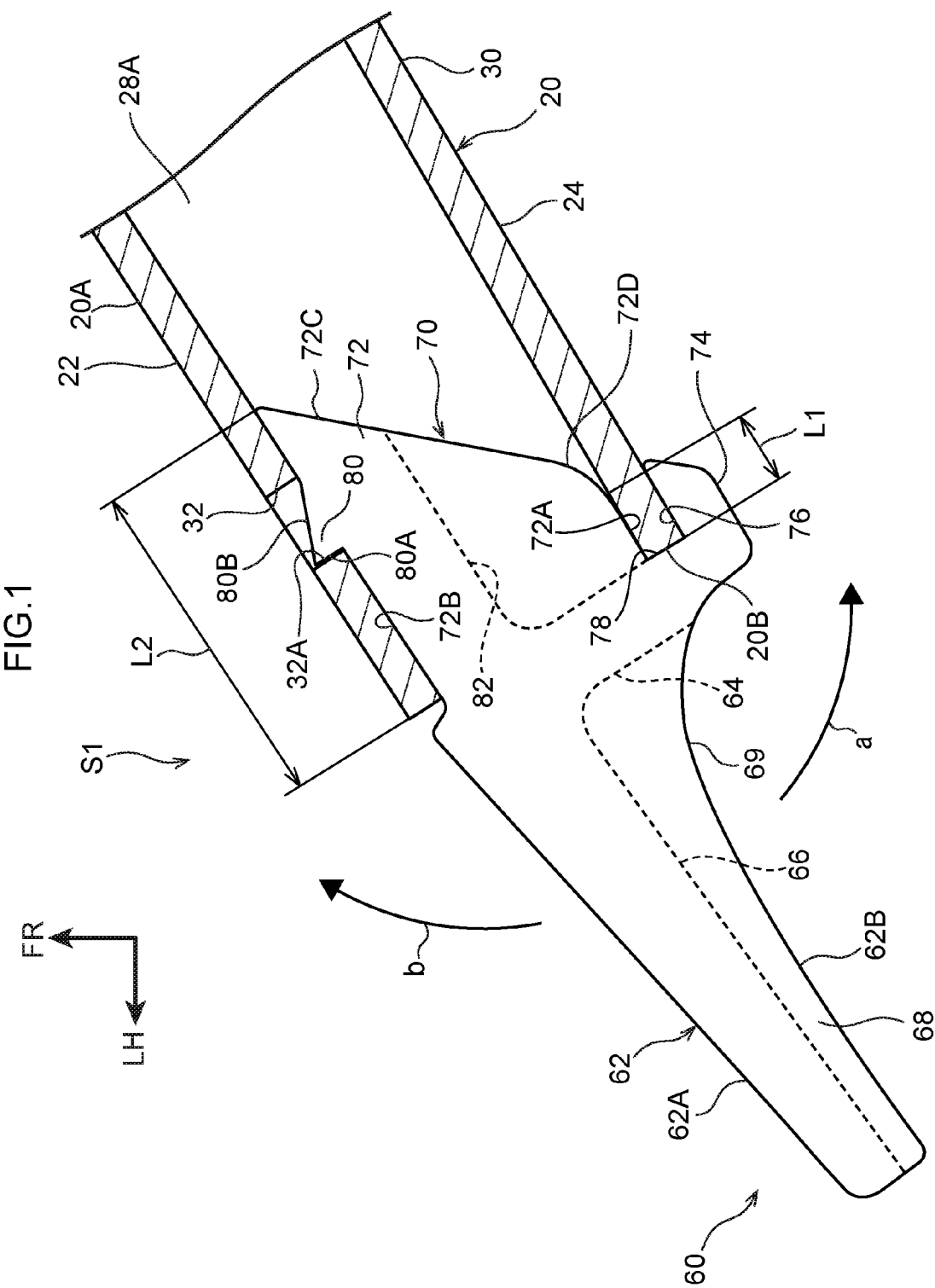
FIG. 1 is a plan sectional view (an enlarged sectional view along line 1-1 of FIG. 4) that is partially broken and that illustrates a vehicle left side end portion of a bumper reinforcement at a front bumper to which is applied a vehicle front portion structure that is equipped with a pedestrian collision detecting sensor and relates to a first embodiment.

A front bumper 12 of a vehicle 10 (an automobile), to which is applied a vehicle front portion structure S1 that is equipped with a pedestrian collision detecting sensor 50 and that relates to a first embodiment, is described hereinafter by using FIG. 1 through FIG. 5C. Note that arrow FR that is shown appropriately in the drawings indicates the vehicle front side, arrow LH indicates the vehicle left side (a vehicle transverse direction one side), and arrow UP indicates the vehicle upper side. Hereinafter, when description is given by using merely the longitudinal, vertical and left-right directions, they refer to the longitudinal of the vehicle longitudinal direction, the vertical of the vehicle vertical direction, and the left and the right of the vehicle left-right direction, unless otherwise indicated.

Figure 2:
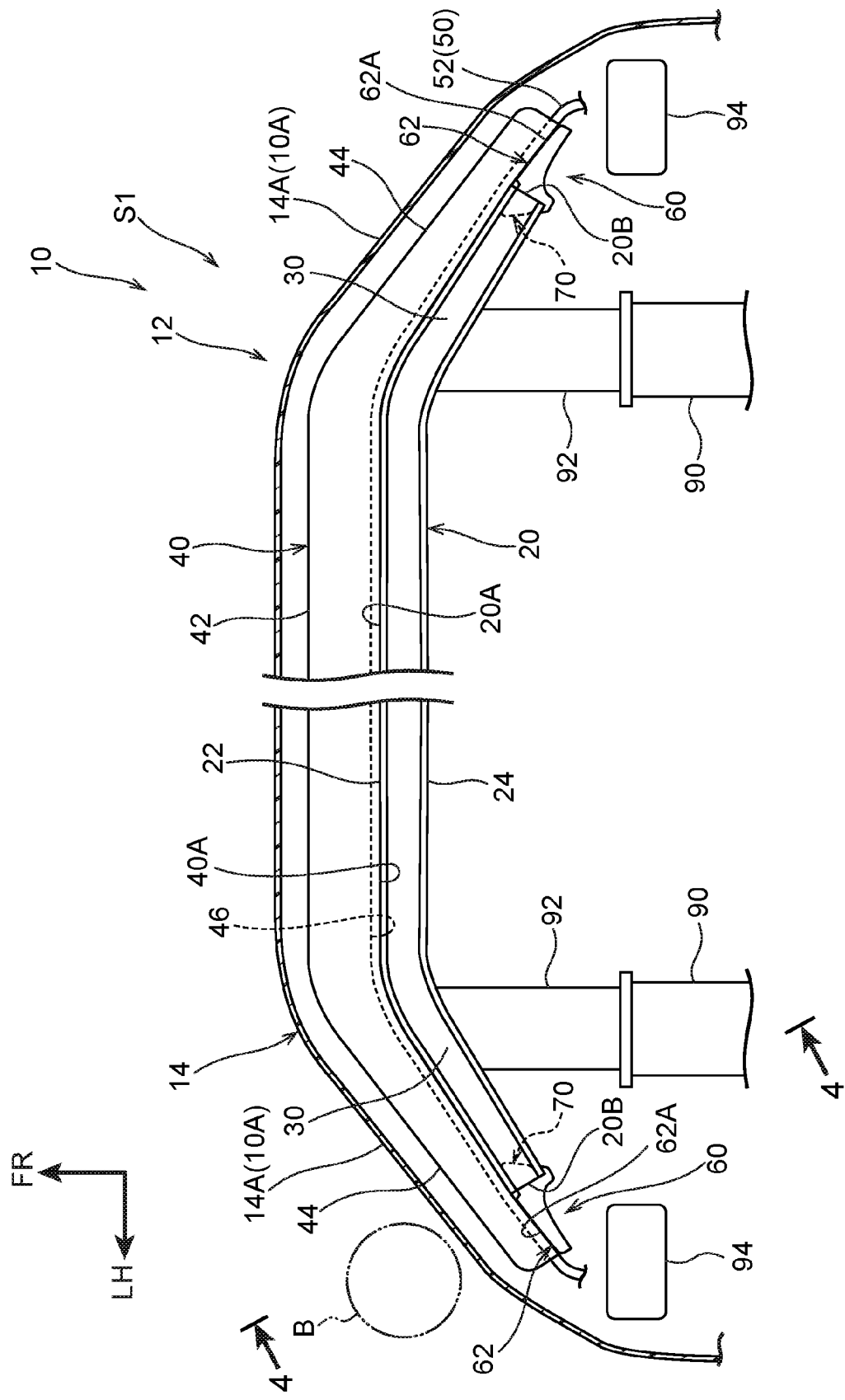
FIG. 2 is a plan view showing the entire front bumper to which is applied the vehicle front portion structure that is equipped with a pedestrian collision detecting sensor and relates to the first embodiment.

As shown in FIG. 2, the front bumper 12 is disposed at the front end portion of the vehicle 10, and detects (the absence or presence of) a collision of a collision body with the vehicle 10. This front bumper 12 is structured to include a bumper cover 14 that structures the front end of the vehicle 10, and a bumper reinforcement 20 (hereinafter called "bumper RF 20") that forms a bumper frame member. Further, the front bumper 12 has an absorber 40 that is disposed between the bumper cover 14 and the bumper RF 20, and a pedestrian collision detecting sensor 50 for detecting a collision of a collision body with the vehicle 10. Moreover, the front bumper 12 has a pair of left and right supporting members 60 that are mounted to the vehicle transverse direction outer side end portions of the bumper RF 20. The aforementioned respective structures are described hereinafter.

(Regarding the Bumper Cover 14)

As shown in FIG. 2, the bumper cover 14 is made of resin. Further, the bumper cover 14 extends in the vehicle transverse direction, and is fixedly supported with respect to the vehicle body by unillustrated portions. Moreover, vehicle transverse direction outer side portions 14A of the bumper cover 14 are inclined toward the rear side while heading toward the vehicle transverse direction outer sides as seen in plan view, and structure corner portions 10A of the vehicle 10.

(Regarding the Bumper RF 20)

As shown in FIG. 2, the bumper RF 20 is disposed at the rear side of the bumper cover 14. This bumper RF 20 is formed substantially in the shape of a rectangular pillar that is hollow and whose length direction is the vehicle transverse direction and that is open toward the vehicle transverse direction outer sides. Further, the bumper RF 20 is structured of a metal material such as an aluminum material or the like, and is manufactured by a method such as extrusion molding or the like.

Figure 3:
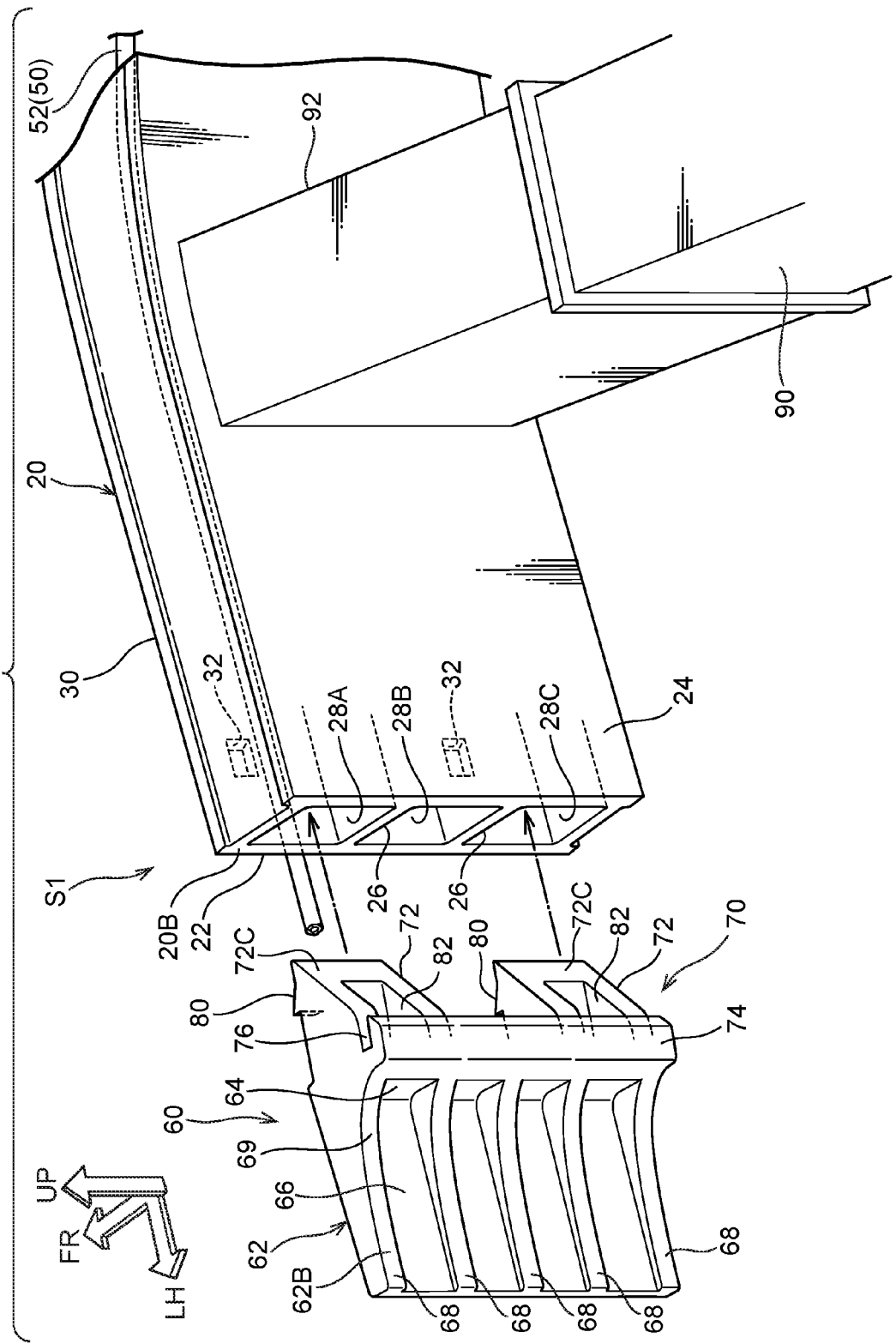
FIG. 3 is an exploded perspective view that is seen from a vehicle obliquely left and rear side and shows a state in which a supporting member shown in FIG. 1 has been removed from the bumper reinforcement.
Figure 4:
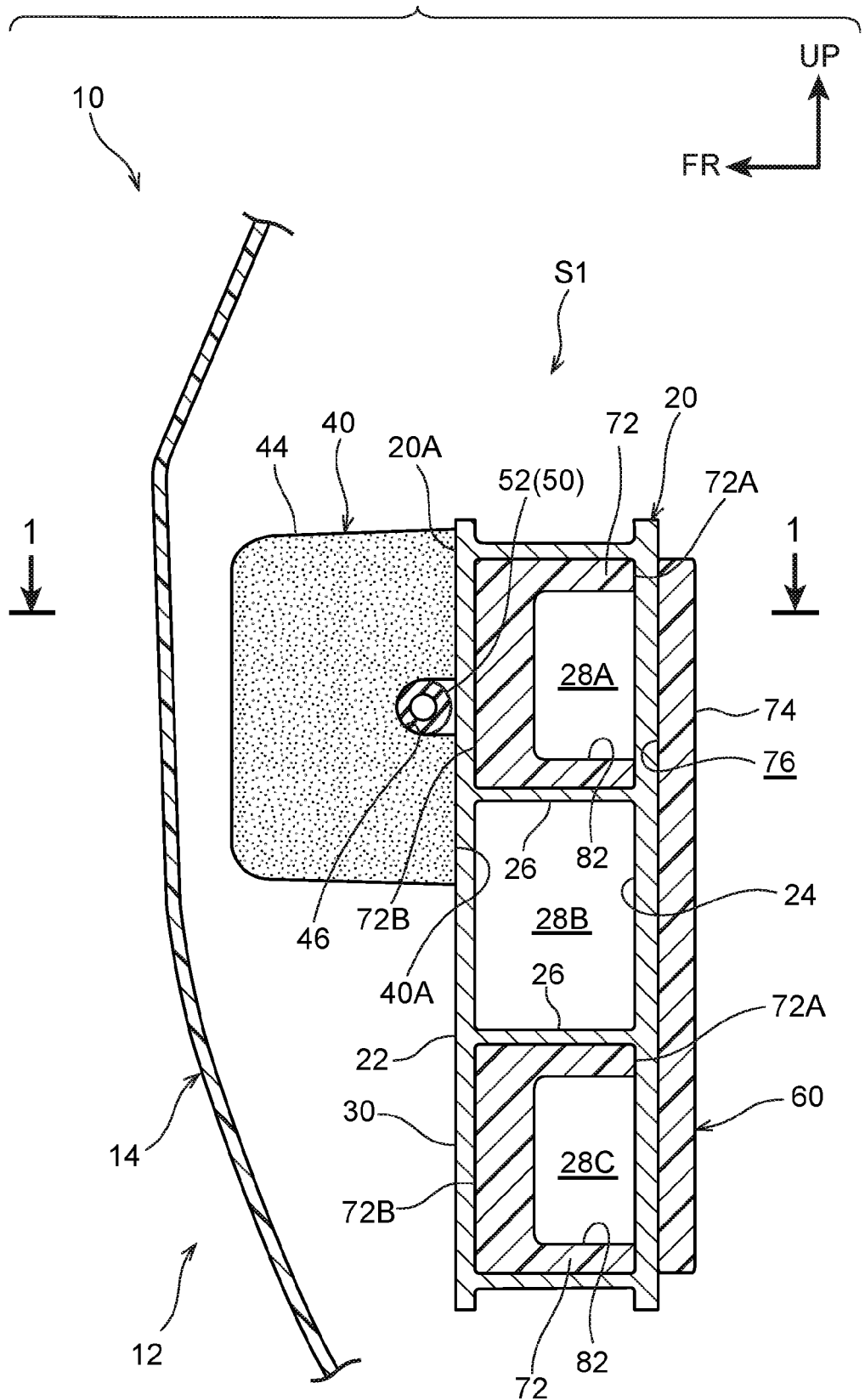
FIG. 4 is a side sectional view (an enlarged sectional view along line 4-4 of FIG. 2) in which the front bumper shown in FIG. 2 is seen from a vehicle left side.
Figure 5A:
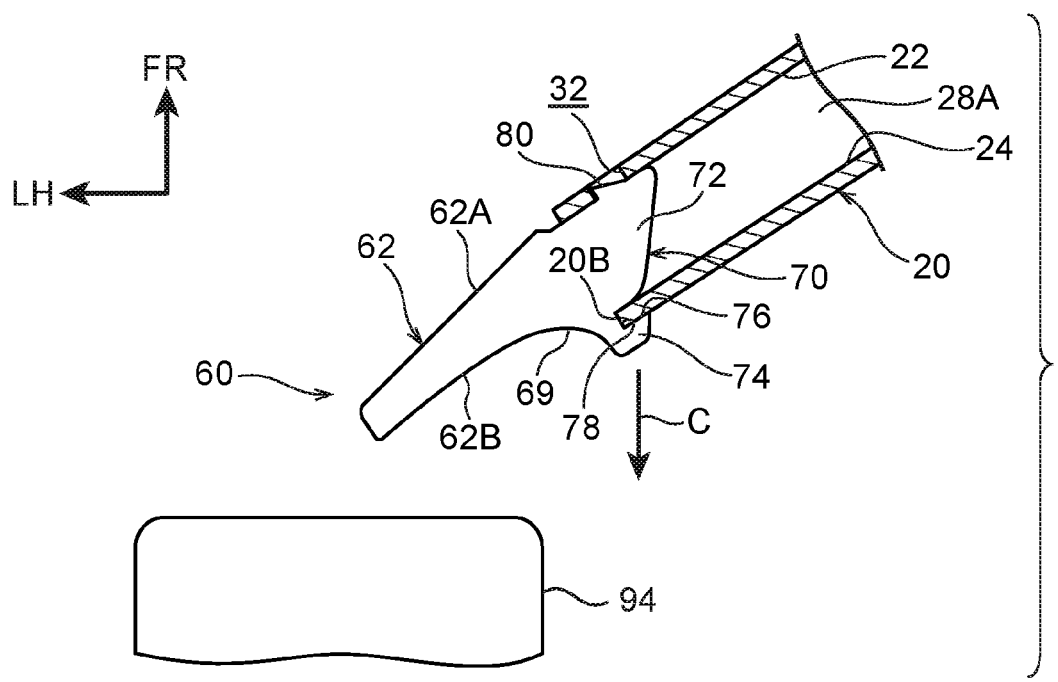
FIG. 5A is a plan view showing a state before the supporting member interferes with a sub-radiator, when a barrier collides from a vehicle front side with the front bumper shown in FIG. 2.
Figure 5B:
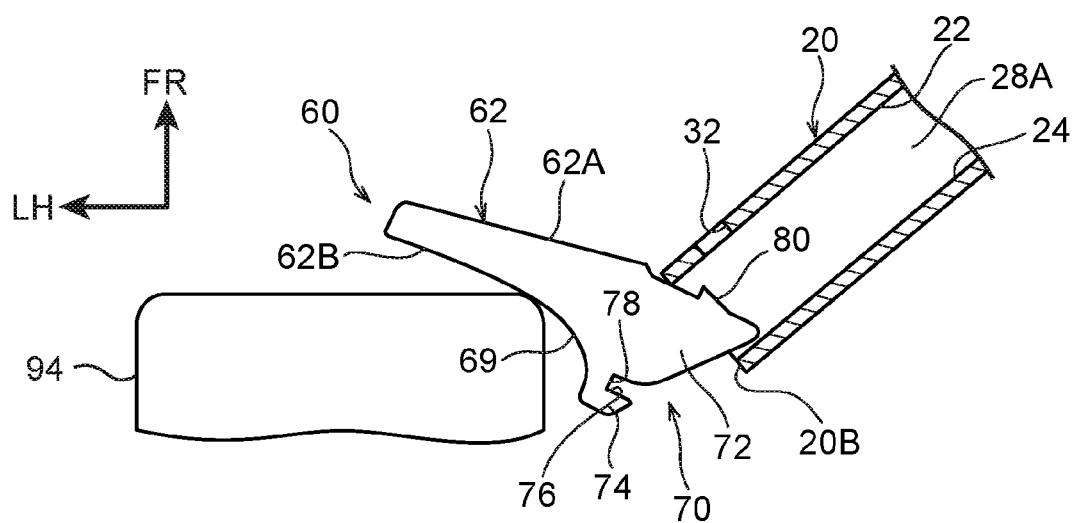
FIG. 5B is a plan view showing a state in which, from the state of FIG. 5A, the supporting member has interfered with the sub-radiator, and a supporting main body portion has been displaced toward the vehicle front side.
Figure 5C:
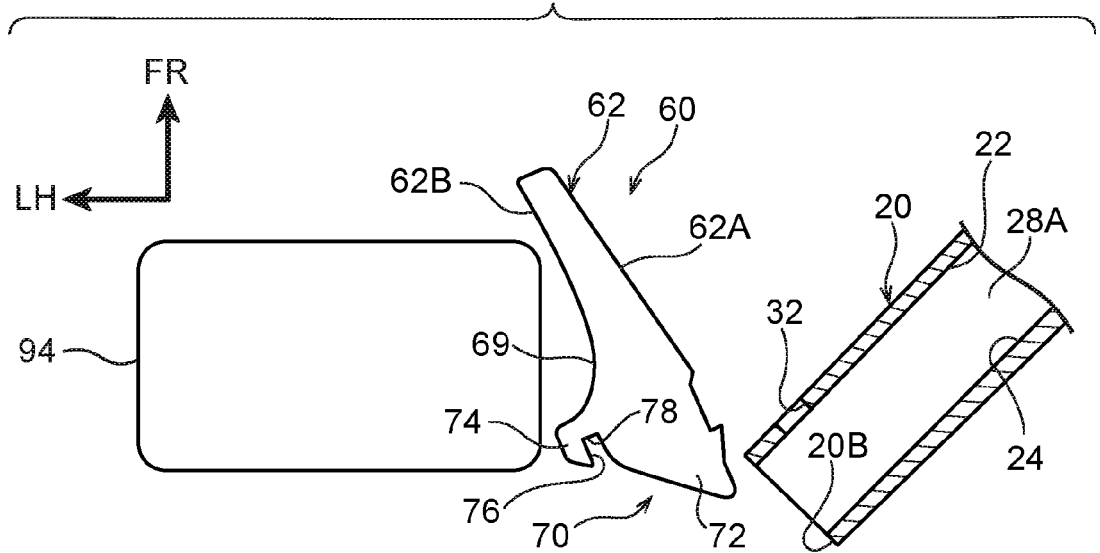
FIG. 5C is a plan view showing a state in which, from the state of FIG. 5B, the bumper reinforcement has been further displaced toward a vehicle rear side, and the supporting member has separated from the bumper reinforcement.

As shown in FIG. 3 and FIG. 4, reinforcing portions 26 that are plate-shaped are provided at the interior of the bumper RF 20, and the reinforcing portions 26 are disposed with the vertical direction being the plate thickness directions thereof, and connect a front wall portion 22 and a rear wall portion 24 of the bumper RF 20. Further, the cross-sectional structure of the bumper RF 20 is made to be a cross-sectional structure in which plural (three in the present embodiment) substantially rectangular closed cross-sections are lined-up in the vertical direction. Namely, in the present embodiment, the pair of reinforcing ribs 26 are disposed so as to be lined-up in the vertical direction at the interior of the bumper RF 20. Further, the closed cross-section that is disposed at the upper portion of the bumper RF 20 is made to be an upper side closed cross-section 28A, and the closed cross-section that is disposed at the vertical direction intermediate portion of the bumper RF 20 is made to be an intermediate closed cross-section 28B, and the closed cross-section that is disposed at the lower portion of the bumper RF 20 is made to be a lower side closed cross-section 28C.

As shown in FIG. 2, bent portions 30 that are bent toward the rear side are formed at the vehicle transverse direction outer side end portions of the bumper RF 20, and the bent portions 30 are inclined toward the rear side while heading toward the vehicle transverse direction outer sides as seen in plan view. Further, a pair of left and right front side members 90 that structure frame members at the vehicle body side extend in the longitudinal direction at the rear side of the bumper RF 20. Further, the proximal end portions at the bent portions 30 of the bumper RF 20 are connected to the front ends of the front side members 90 via crash boxes 92. Moreover, in the state in which the bumper RF 20 is connected to the front side members 90, the distal end side portions of the bent portions 30 of the bumper RF 20 project-out toward the vehicle transverse direction outer sides with respect to the crash boxes 92 and the front side members 90.

As shown in FIG. 1 and FIG. 3, engaged holes 32, that serve as a pair of upper and lower "engaged portions" and that are engaged with engaging claw portions 80 of the supporting members 60 that are described later, are formed in the distal end portions of the bent portions 30 of the bumper RF 20. The engaged holes 32 are formed so as to respectively pass-through regions that structure the upper side closed cross-section 28A and the lower side closed cross-section 28C at the front wall portion 22, and are formed in substantially rectangular shapes. Further, the vehicle transverse direction outer side surface at the inner peripheral surface of the front wall portion 22 is made to be an engaged surface 32A (see FIG. 1).

(Regarding the Absorber 40)

As shown in FIG. 2, the absorber 40 is structured by a foamed resin material, i.e., an urethane foam or the like. This absorber 40 is provided between the bumper cover 14 and the bumper RF 20, and is formed in an elongated shape whose length direction is the vehicle transverse direction, and is disposed along the length direction of the bumper RF 20. Concretely, the absorber 40 has an absorber main body portion 42 that structures the vehicle transverse direction intermediate portion of the absorber 40, and the absorber main body portion 42 is disposed adjacent to the front side of the vehicle transverse direction intermediate portion of the bumper RF 20. Further, the absorber 40 has absorber side portions 44 that structure the vehicle transverse direction outer side portions of the absorber 40. The absorber side portions 44 are disposed adjacent to the front sides of the bent portions 30 of the bumper RF 20.

Further, as shown in FIG. 4, the absorber 40 is formed in a substantially rectangular shape as seen in a cross-section viewed from the length direction thereof, and is disposed at the front side of the upper portion of the bumper RF 20 (in detail, the portion that structures the upper side closed cross-section 28A), and is fixed to a front surface 20A of the bumper RF 20. Further, as shown in FIG. 2, the length in the length direction of the absorber main body portion 42 is set so as to be long as compared with the length in the length direction of the bumper RF 20, and the distal end portions of the absorber side portions 44 project-out toward the vehicle transverse direction outer sides with respect to the bumper RF 20.

As shown in FIG. 4, a holding groove portion 46, that holds a pressure tube 52 that is described later, is formed in a rear surface 40A of the absorber 40. This holding groove portion 46 is formed in a substantial C-shape that opens toward the rear side as seen in a side sectional view (in detail, in a circular shape that is partially open toward the rear side), and passes-through in the length direction of the absorber 40.

(Regarding the Pedestrian Collision Detecting Sensor 50)

As shown in FIG. 2 through FIG. 4, the pedestrian collision detecting sensor 50 has the pressure tube 52 that serves as a "pressure sensor member". The pressure tube 52 is formed in an elongated shape, and is structured as a hollow structure of a substantially annular cross-section. Further, the outer diameter dimension of the pressure tube 52 is set to be slightly small as compared with the inner diameter dimension of the holding groove portion 46 of the absorber 40, and the length of the pressure tube 52 in the length direction is set to be long as compared with the length of the absorber 40 in the length direction. Further, the pressure tube 52 is assembled into (fit into) the holding groove portion 46 (see FIG. 4). Note that the holding groove portion 46 and the pressure tube 52 are disposed at the lower side with respect to the engaged hole 32 that is at the upper side of the above-described bumper RF 20, and the holding groove portion 46 and the pressure tube 52 and the engaged holes 32 are set so as to not overlap as seen in plan view.

Further, the pedestrian collision detecting sensor 50 has pressure sensors (not illustrated), and the pressure sensors are provided at the length direction both end portions of the pressure tube 52. The pressure sensors are electrically connected to an unillustrated ECU (a collision judging means). Further, due to the pressure tube 52 deforming, a signal corresponding to the change in pressure within the pressure tube 52 is outputted from the pressure sensor to the ECU. Further, a collision speed sensor (not shown) is electrically connected to the ECU, and the collision speed sensor outputs a signal, that corresponds to the speed of a collision with a collision body, to the ECU. Further, the ECU computes the collision load on the basis of the aforementioned output signal of the pressure sensor, and computes the collision speed on the basis of the output signal of the collision speed sensor. Moreover, the ECU determines the effective mass of the collision body from the computed collision load and collision speed, and judges whether or not the effective mass exceeds a threshold value, and judges whether the collision body that collides with the front bumper 12 is a pedestrian or is other than a pedestrian (e.g., is an obstacle on the road such as a road sign or a bollard or the like).

(Regarding the Supporting Member 60)

As shown in FIG. 2, the supporting members 60 are made of resin. Further, the supporting members 60 are respectively mounted to the distal end portions of the bent portions 30 of the bumper RF 20, and extend-out toward the vehicle transverse direction outer sides from the bumper RF 20. Namely, the supporting members 60 are supported in cantilevered manners at the bumper RF 20, and are respectively disposed at the rear sides with respect to the corner portions 10A of the vehicle 10. Further, the pair of supporting members 50 are structured so as to be symmetrical at the left and the right in the vehicle transverse direction. Therefore, in the following description, the supporting member 60 that is disposed at the left side is described, and description of the supporting member 60 that is disposed at the right side is omitted.

The supporting member 60 is structured to include a supporting main body portion 62 that supports the distal end portion of the above-described absorber side portion 44 and the pressure tube 52, and a mounting mechanism portion 70 for mounting the supporting member 60 to the bumper RF 20. As shown in FIG. 1, the supporting main body portion 62 is disposed at the vehicle transverse direction outer side with respect to the bumper RF 20 and at the rear side with respect to the distal end portion of the absorber side portion 44 (see FIG. 2), and is formed substantially in the shape of a right triangular pillar as seen in plan view. Concretely, as shown in FIG. 3 as well, the supporting main body portion 62 has a base wall portion 64. This base wall portion 64 is formed in a substantially rectangular plate shape, and is disposed with the length direction of the bent portion 30 at the bumper RF 20 being the plate thickness direction thereof, and is disposed so as to cover a vehicle transverse direction outer side end surface 20B (hereinafter simply called "end surface 20B") of the bumper RF 20 from the vehicle transverse direction outer side.

Further, the supporting main body portion 62 has a front wall portion 66, and the front wall portion 66 extends from the front end portion of the base wall portion 64 toward the vehicle transverse direction outer side so as to be substantially parallel to the front wall portion 22 of the bumper RF 20. Further, a front surface 62A of the supporting main body portion 62 is structured by the front wall portion 66, and the front surface 62A is formed so as to be substantially flush with the front surface 20A of the bumper RF 20, and is disposed adjacent to the rear side of (the distal end portion of) the absorber side portion 44 (see FIG. 2). Due thereto, the supporting main body portion 62 is structured so as to support the absorber side portion 44 and the pressure tube 52 from the rear side.

Further, the supporting main body portion 62 has plural (at five places in the present embodiment) reinforcing ribs 68. The reinforcing ribs 68 are formed in substantially triangular plate shapes whose plate thickness directions are the vertical direction, and are disposed so as to be lined-up at a predetermined interval each in the vertical direction, and connect the base wall portion 64 and the front wall portion 66. Due thereto, the supporting main body portion 62 is reinforced by the reinforcing ribs 68, and the bending rigidity of the supporting main body portion 62 in the longitudinal direction is made to be high by the reinforcing ribs 68. Further, a rear surface 62B of the supporting main body portion 62 is structured by the reinforcing ribs 68, and the rear surface 62B is inclined toward the front wall portion 66 side while heading toward the vehicle transverse direction outer side, as seen in plan view. Due thereto, the width dimension of the supporting main body portion 62 in the longitudinal direction is set to become smaller toward the vehicle transverse direction outer side. Further, a curved surface 69, that serves as a "recessed portion" and is substantially circular arc shaped and opens toward the rear side as seen in plan view, is formed at the vehicle transverse direction inner side portion of the rear surface 62B.

The mounting mechanism portion 70 has a pair of upper and lower fit-together portions 72, and the pair of fit-together portions 72 are disposed so as to be lined-up with a predetermined interval therebetween in the vertical direction. The fit-together portions 72 are formed in substantially trapezoidal pillar shapes as seen in plan view, and project-out from the base wall portion 64 toward the vehicle transverse direction inner side along the length direction of the bent portion 30 at the bumper RF 20. Further, the fit-together portions 72 are respectively press-fit into the upper side closed cross-section 28A interior and into the lower side closed cross-section 28C interior of the bumper RF 20 from the vehicle transverse direction outer side (refer to the arrows in FIG. 3), and are fit-together with the upper side closed cross-section 28A interior and the lower side closed cross-section 28C interior (refer to FIG. 1 and FIG. 4). Due thereto, the supporting member 60 is mounted to the distal end portion of the bent portion 30 of the bumper RF 20, and the mounted posture of the supporting main body portion 62 (the state shown in FIG. 1) is maintained.

Further, as shown in FIG. 1, distal end surfaces 72C of the fit-together portions 72 are inclined toward the vehicle transverse direction outer side while heading toward the rear side as seen in plan view. Due thereto, fit-together length L1, with the rear wall portion 24 of the bumper RF 20, at the fit-together portion 72 is set to be short as compared with fit-together length L2 with the front wall portion 22 of the bumper RF 20.

Moreover, a corner R that is formed in a substantially circular arc shape as seen in plan view is formed at a corner portion 72D that is the boundary portion between the distal end surface 72C and a rear surface 72A of the fit-together portion 72. Further, although details thereof will be described later, the length of the aforementioned fit-together length L1 and the radius of the corner R of the aforementioned corner portion 72D are set such that the fit-together state of the fit-together portions 72 and the bumper RF 20 is cancelled when load of a predetermined value or greater is inputted to the supporting main body portion 62 from the rear side.

Further, the mounting mechanism portion 70 has a flange portion 74 that extends-out toward the vehicle transverse direction inner side from the rear end portion of the base wall portion 64. This flange portion 74 is disposed at the rear side with respect to the bumper RF 20, and is disposed parallel to the rear surfaces 72A of the fit-together portions 72. Due thereto, a fit-together groove portion 76, that serves as a "groove portion" and opens toward the vehicle transverse direction inner side and passes-through in the vertical direction, is formed between the fit-together portions 72 and the flange portion 74. The width dimension of this fit-together groove portion 76 is set so as to be slightly large as compared with the plate thickness dimension of the rear wall portion 24 of the bumper RF 20, and the vehicle transverse direction outer side end portion of the rear wall portion 24 is fit into the fit-together groove portion 76. Further, the base surface of the fit-together groove portion 76 is made to be an abutting portion 78 that structures the mounting mechanism portion 70, and the abutting portion 78 is disposed so as to face the end surface 20B of the rear wall portion 24 of the bumper RF 20 in the length direction of the bumper RF 20, and is structured so as to be able to abut the end surface 20B of the rear wall portion 24.

Further, the engaging claw portions 80 that serve as "engaging portions" are formed integrally with the upper portions of front surfaces 72B of the fit-together portions 72. The engaging claw portions 80 are formed in substantially triangular shapes as seen in plan view, and project-out from the fit-together portions 72 toward the front side, and are disposed within the engaged holes 32 of the bumper RF 20. Concretely, the engaging claw portion 80 is structured to include an engaging surface 80A that is disposed so as to face the engaged surface 32A of the engaged hole 32, and an inclined surface 80B that is inclined from the front end of the engaging surface 80A toward the vehicle rear side while heading toward the vehicle transverse direction inner side. Further, the engaging surface 80A of the engaging claw portion 80 is engaged with the engaged surface 32A of the engaged hole 32.

Moreover, as shown in FIG. 3 as well, a concave portion 82 that opens toward the vehicle transverse direction inner side and the rear side is formed in the substantially central portion of the fit-together portion 72, and the concave portion 82 is formed in a substantially trapezoidal shape as seen in a planar sectional view. Further, as shown in FIG. 2, a sub-radiator 94 that serves as a "peripheral part" is disposed at the rear side of the supporting member 60 (the supporting main body portion 62).

Operation and effects of the first embodiment are described next.

At the front bumper 12 of the vehicle 10 to which is applied the vehicle front portion structure S1 that is equipped with the pedestrian collision detecting sensor 50 and is structured as described above, the mounting mechanism portion 70 of the supporting member 60 is mounted to the distal end portion of the bent portion 30 of the bumper RF 20. Further, the supporting main body portion 62 of the supporting member 60 extends-out toward the vehicle transverse direction outer side from the bumper RF 20. Further, (the distal end portion of) the absorber side portion 44 and the pressure tube 52 are adjacent to the front side of the supporting main body portion 62. Here, when a collision body such as a pedestrian or the like collides with the vehicle transverse direction outer side portion 14A (here, the vehicle transverse direction outer side portion 14A at the left side) of the front bumper 12, the bumper cover 14 deforms toward the rear side and pushes the absorber 40 toward the rear side. Therefore, load from the front side is inputted to the supporting main body portion 62 of the supporting member 60 via the absorber 40.

When load from the front side is inputted to the supporting main body portion 62, the supporting main body portion 62 starts to be displaced toward the rear side. At this time, because the supporting member 60 is supported in a cantilevered manner at the bumper RF 20, the supporting member 60 starts to pivot counterclockwise (in the arrow a direction in FIG. 1) with the end surface 20B of the rear wall portion 24 of the bumper RF 20 being the fulcrum, as seen in plan view. Due thereto, the fit-together portions 72 of the supporting member 60 start to be displaced toward the front side, but, because the fit-together portions 72 are fit-together with the upper side closed cross-section 28A interior and the lower side closed cross-section 28C interior of the bumper RF 20, displacement of the fit-together portions 72 toward the front side is limited by the front wall portion 22 of the bumper RF 20. As a result, pivoting of the supporting member 60 is limited, and the supporting member 60 supports the absorber side portion 44 and the pressure tube 52 from the rear side with respect to load from the front side. Due thereto, the absorber 40 is crushed (compressively deformed) in the longitudinal direction, and the pressure tube 52 deforms (is crushed), and the pressure within the pressure tube 52 changes.

Further, the pressure sensor outputs to the ECU a signal that corresponds to the change in pressure of the pressure tube 52, and the ECU computes the collision load on the basis of the output signal of the pressure sensor. On the other hand, the ECU computes the collision speed on the basis of the output signal of the collision speed sensor. Further, the ECU determines the effective mass of the collision body from the computed collision load and collision speed, and judges whether or not the effective mass exceeds a threshold value, and judges whether or not the collision body that has collided with the front bumper 12 is a pedestrian. Accordingly, a collision with a collision body at the corner portion 10A of the vehicle 10 can be detected.

A damage test at the vehicle 10 is described next. In this damage test, a pendulum-type barrier B (see FIG. 2) is made to collide from the front side with the vehicle transverse direction outer side portion 14A (here, the vehicle transverse direction outer side portion 14A at the left side) of the front bumper 12. At this time, the barrier B penetrates into the vehicle 10 toward the rear side, and, accompanying the penetration of the barrier B into the vehicle 10, the bumper RF 20 is displaced toward the rear side, and the supporting member 60 is, together with the bumper RF 20, displaced toward the rear side (the sub-radiator 94 side) (refer to arrow c of FIG. 5A). Further, when the bumper RF 20 is displaced further toward the rear side, the supporting main body portion 62 of the supporting member 60 interferes with (hits) the sub-radiator 94.

Concretely, the distal end portion of the supporting member 60 interferes with the front portion of the sub-radiator 94, and load from the rear side is inputted to the supporting main body portion 62. When load from the rear side is inputted to the supporting main body portion 62, the supporting main body portion 62 starts to be displaced toward the front side. At this time, because the supporting member 60 is supported at the bumper RF 20 in a cantilevered manner, the supporting member 60 starts to pivot clockwise (in the arrow b direction in FIG. 1) with the end surface 20B of the front wall portion 22 of the bumper RF 20 being the fulcrum, as seen in plan view. Due thereto, the fit-together portions 72 of the supporting member 60 start to be displaced toward the rear side, but, because the fit-together portions 72 are fit-together with the upper side closed cross-section 28A interior and the lower side closed cross-section 28C interior of the bumper RF 20, displacement of the fit-together portions 72 toward the rear side is limited by the rear wall portion 24 of the bumper RF 20.

Here, there is a structure in which, when load that is a predetermined value or greater is inputted to the supporting main body portion 62 from the rear side, the fit-together state of the fit-together portions 72 and the bumper RF 20 is cancelled. Concretely, when load from the rear side that is inputted to the supporting main body portion 62 is a predetermined value or greater, the rear surfaces 72A and the corner portions 72D of the fit-together portions 72 slide toward the vehicle transverse direction outer side on the front surface of the rear wall portion 24 of the bumper RF 20, and finally separate from the bumper RF 20. Due thereto, the fit-together state of the bumper RF 20 and the fit-together portions 72 is cancelled, and the supporting main body portion 62 is displaced toward the front side (see FIG. 5B). Further, when the bumper RF 20 is displaced further toward the rear side accompanying the penetration of the barrier B in toward the rear side, the entire supporting member 60 separates from the bumper RF 20 (refer to FIG. 5C).

In this way, in accordance with the vehicle front portion structure S1 that is equipped with the pedestrian collision detecting sensor 50 and relates to the present embodiment, in a damage test, when the supporting member 60 interferes with the sub-radiator 94, that is disposed at the rear side of the supporting member 60, and load from the rear side that is inputted to the supporting member 60 is a predetermined value or greater, the supporting member 60 separates from the bumper RF 20. Therefore, damage to the sub-radiator 94 can be suppressed or prevented. Due thereto, the damageability with respect to the sub-radiator 94 can be improved. Due to the above, a collision with a collision body at the corner portion 10A of the vehicle 10 can be detected, while the damageability with respect to the sub-radiator 94 is improved.

Further, the fit-together length L1 of the fit-together portions 72 and the rear wall portion 24 of the bumper RF 20 is set to be short as compared with the fit-together length L2 of the fit-together portions 72 and the front wall portion 22 of the bumper RF 20. Therefore, by appropriately setting the fit-together lengths L1, L2 of the fit-together portions 72 with respect to the bumper RF 20, the mounting strength of the supporting member 60 with respect to load from the rear side is set to be low as compared with the mounting strength of the supporting member 60 with respect to load from the front side, and both an improvement in the damageability with respect to the sub-radiator 94 and an enlargement of the range of detection at the pedestrian collision detecting sensor 50 can be achieved. Namely, by setting the fit-together length L2 of the fit-together portions 72 with respect to the bumper RF 20 appropriately, the fit-together state of the supporting member 60 and the bumper RF 20 with respect to load from the front side is maintained (the mounted posture of the supporting main body portion 62 is maintained), and the absorber side portion 44 and the pressure tube 52 can be supported from the rear side by the supporting main body portion 62. On the other hand, by appropriately setting the fit-together length L1 of the fit-together portions 72 with respect to the bumper RF 20, the fit-together state of the supporting member 60 and the bumper RF 20 is cancelled with respect to load from the rear side, and damage with respect to the sub-radiator 94 can be suppressed or prevented. Accordingly, even in a case in which the supporting members 60 are provided at the bumper RF 20 in order to enlarge the range of detection of the pedestrian collision detecting sensor 50, an improvement in the damageability with respect to the sub-radiator 94 can be realized by a simple structure.

Further, the mounting mechanism portion 70 of the supporting member 60 has the abutting portion 78 that abuts the end surface 20B of the rear wall portion 24 of the bumper RF 20. Therefore, when load from the front side is inputted to the supporting main body portion 62, and the supporting member 60 starts to pivot with the end surface 20B of the rear wall portion 24 of the bumper RF 20 being the fulcrum as seen in plan view, the supporting member 60 can be supported well by the abutting portion 78 and the fit-together portions 72. Further, at this time, the reaction force that is applied from the bumper RF 20 to the supporting member 60 can be dispersed to the regions of the front surfaces 72B of the fit-together portions 72 and the abutting portion 78. Due thereto, stress concentrating at the supporting member 60 can be suppressed.

Further, the vehicle transverse direction outer side end portion of the rear wall portion 24 of the bumper RF 20 is fit-in the fit-together groove portion 76 of the supporting member 60. Therefore, when load from the front side is inputted to the supporting main body portion 62 and the supporting member 60 starts to rotate counterclockwise with the end surface 20B of the rear wall portion 24 of the bumper RF 20 being the fulcrum as seen in plan view, the flange portion 74 that structures the fit-together groove portion 76 is displaced toward the rear wall portion 24 side of the bumper RF 20. Therefore, because the inner peripheral surface, at the flange portion 74 side, of the fit-together groove portion 76 abuts the rear wall portion 24 of the bumper RF 20, pivoting of the bumper RF 20 can be suppressed more. Due thereto, the supporting performance of the supporting member 60 with respect to the absorber side portion 44 and the pressure tube 52 can be improved more.

Moreover, the engaging claw portions 80 of the supporting member 60 are disposed within the engaged holes 32 of the bumper RF 20, and the engaging surfaces 80A of the engaging claw portions 80 are engaged with the engaged surfaces 32A of the engaged holes 32. Therefore, relative movement, toward the vehicle transverse direction outer side, of the supporting member 60 with respect to the bumper RF 20 after mounting of the supporting member 60 to the bumper RF 20 can be limited. As a result, for example, even if the fit-together state of the bumper RF 20 and the fit-together portions 72 of the supporting member 60 were to change due thermal shock or the like and the extraction force of the fit-together portions 72 from the bumper RF 20 were to decrease, the supporting member 60 can be prevented from coming-out from the bumper RF 20 toward the vehicle transverse direction outer side.

Further, the width dimension, in the longitudinal direction, of the supporting main body portion 62 of the supporting member 60 is set so as to become smaller toward the vehicle transverse direction outer side. Therefore, the setting space of the supporting main body portion 62 becoming large can be suppressed.

Moreover, the curved surface 69 that opens toward the vehicle rear side as seen in plan view is formed at the rear surface 62B of the supporting main body portion 62 of the supporting member 60. Therefore, the supporting main body portion 62 abutting parts other than the sub-radiator 94 at the time when the supporting member 60 is displaced toward the rear side in a damage test for example, can be suppressed.

Further, the reinforcing ribs 68 are formed at the supporting main body portion 62 of the supporting member 60, and the bending rigidity of the supporting main body portion 62 in the longitudinal direction is made to be high. Therefore, flexural deformation of the supporting main body portion 62 itself at the time when load from the front side is applied to the supporting main body portion 62 can be suppressed. Due thereto, when load from the front side is inputted from the absorber 40 to the supporting member 60, the reaction force with respect to that load can be applied efficiently. Accordingly, the detection accuracy of the pedestrian collision detecting sensor 50 can be made to be high.

Second Embodiment

A vehicle front portion structure S2, that is equipped with the pedestrian collision detecting sensor 50 and relates to a second embodiment, is described by using FIG. 6. The second embodiment is structured similarly to the first embodiment, except for the form of a supporting member 100 and the structure of mounting the supporting member 100 to the bumper RF 20. Note that, in the following description, portions of the supporting member 100 that are structured similarly to the supporting member 60 of the first embodiment are denoted by the same reference numerals.

Namely, in the second embodiment, the reinforcing ribs 68 of the first embodiment are omitted at the supporting main body portion 62 of the supporting member 100, and the supporting main body portion 62 has a rear wall portion 102 that structures the rear surface 62B of the supporting main body portion 62. This rear wall portion 102 extends from the rear end portion of the base wall portion 64 toward the vehicle transverse direction outer side, and is joined to the distal end portion of the front wall portion 66. Due thereto, the supporting main body portion 62 is formed in the shape of a substantially triangular pillar that is hollow and is open in the vertical direction. Moreover, as seen in plan view, the supporting main body portion 62 is formed in the shape of a substantially isosceles triangle whose vertex is the vehicle transverse direction outer side end portion, and extends-out toward the vehicle transverse direction outer side from the bumper RF 20.

Further, instead of the reinforcing ribs 68 of the first embodiment, the supporting main body portion 62 has a first reinforcing rib 104 and a second reinforcing rib 106 that serve as "reinforcing ribs", and the first reinforcing rib 104 and the second reinforcing rib 106 are provided at the interior of the supporting main body portion 62. The first reinforcing rib 104 extends toward the vehicle transverse direction outer side from the longitudinal direction intermediate portion of the base wall portion 64, and is joined to the vehicle transverse direction outer side end portion of the supporting main body portion 62. Further, the second reinforcing rib 106 extends toward the rear side from the left-right direction intermediate portion of the front wall portion 66, and is joined to the rear wall portion 102. Namely, the first reinforcing rib 104 and the second reinforcing rib 106 intersect at the substantially central portion of the supporting main body portion 62 as seen in plan view. Due thereto, the bending rigidity of the supporting main body portion 62 in the longitudinal direction and the left-right direction is made to be high by the first reinforcing rib 104 and the second reinforcing rib 106.

On the other hand, the fit-together portion 72 at the mounting mechanism portion 70 of the supporting member 100 is structured by a front side fit-together wall portion 110 and a rear side fit-together wall portion 112. The front side fit-together wall portion 110 projects-out from the base wall portion 64 along the rear surface of the front wall portion 22 of the bumper RF 20 toward the vehicle transverse direction inner side. Further, the rear side fit-together wall portion 112 projects-out from the base wall portion 64 toward the vehicle transverse direction inner side along the front surface of the rear wall portion 24 of the bumper RF 20. Further, in the same way as in the first embodiment, the fit-together length L1, with the rear wall portion 24 of the bumper RF 20, at the fit-together portion 72 is set to be short as compared with the fit-together length L2 with the front wall portion 22 of the bumper RF 20. Further, a distal end surface 112A of the rear side fit-together wall portion 112 is formed in the shape of a circular arc that is convex toward the rear wall portion 24 side of the bumper RF 20 as seen in plan view, and is smoothly connected to the rear surface of the rear side fit-together wall portion 112.

Moreover, in the second embodiment, the engaged holes 32 of the first embodiment are omitted at the bumper RF 20, and the engaging claw portions 80 of the first embodiment are omitted at the supporting member 100. Further, a pair of upper and lower fixing holes 34 that are circular are formed so as to pass-through the front wall portion 22 of the bumper RF 20 (in FIG. 6, only the fixing hole 34 at the upper side is shown), and insert-through holes 110A that are circular are formed so as to pass-through the front side fit-together wall portions 110 at positions corresponding to the fixing holes 34. Further, fixing bolts 120 that serve as "fastening members" are inserted from the front side into the fixing holes 34 and the insert-through holes 110A, and fixing nuts 122 that serve as "fastening members" are screwed-together with the distal end portions of the fixing bolts 120. Due thereto, the front side fit-together wall portions 110 are fixed to the front wall portion 22 of the bumper RF 20 by the fixing bolts 120 and the fixing nuts 122. Note that the above-described fixing bolts 120 are disposed at positions in the vertical direction at which they do not interfere with the pressure tube 52 (not shown in FIG. 6), and concave portions (not shown), that open toward the rear side and are for the placement of the head portions of the fixing bolts 120, are formed in the rear surface 40A of the absorber 40 (not shown in FIG. 6).

Further, a notch 114 is formed in the proximal end portion (the border portion between the front side fit-together wall portion 110 and the base wall portion 64) of the front side fit-together wall portion 110. This notch 114 is formed in the shape of a substantially V-shaped groove that opens toward the rear side as seen in plan view, and passes-through in the vertical direction. Further, the portion, at which the notch 114 is formed, at the proximal end portion of the front side fit-together wall portion 110 is made to be a bending starting point portion 116. Moreover, in the second embodiment, there is a structure in which when load of a predetermined value or greater is inputted to the supporting main body portion 62 from the rear side, the fit-together state of the bumper RF 20 and the rear side fit-together wall portions 112 of the supporting member 100 is cancelled, and the supporting member 100 bendingly deforms with the bending starting point portions 116 being the starting point, and the supporting main body portion 62 is displaced toward the front side.

Further, when load from the front side is inputted to the supporting main body portion 62, in the same way as in the first embodiment, the supporting member 100 starts to pivot counterclockwise with the end surface 20B of the rear wall portion 24 of the bumper RF 20 being the fulcrum as seen in plan view, but pivoting of the supporting member 100 is limited by the front wall portion 22 of the bumper RF 20. Due thereto, in a collision with a collision body at the corner portion 10A of the vehicle 10, the absorber side portion 44 and the pressure tube 52 can be supported from the rear side by the supporting member 100. As a result, a collision with a collision body at the corner portion 10A of the vehicle 10 can be detected.

On the other hand, in a damage test of the vehicle 10, when the supporting member 100 is displaced toward the rear side together with the bumper RF 20, and the supporting main body portion 62 of the supporting member 100 interferes with the sub-radiator 94, load from the rear side is inputted to the supporting main body portion 62. When load from the rear side is inputted to the supporting main body portion 62, in the same way as in the first embodiment, the supporting member 100 starts to pivot clockwise with the end surface 20B of the front wall portion 22 of the bumper RF 20 being the fulcrum, as seen in plan view. At this time, the fit-together portions 72 of the supporting member 100 start to be displaced toward the rear side, but the fit-together portions 72 are fit-together with the upper side closed cross-section 28A interior and the lower side closed cross-section 28C interior of the bumper RF 20, and the front side fit-together wall portions 110 are fixed to the front wall portion 22 of the bumper RF 20 by the fixing bolts 120 and the fixing nuts 122, and therefore, displacement of the fit-together portions 72 toward the rear side is limited.

Here, there is a structure in which, when load of a predetermined value or greater is inputted to the supporting main body portion 62 from the rear side, the fit-together state of the bumper RF 20 and the rear side fit-together wall portions 112 of the supporting member 100 is cancelled, and the supporting member 100 bendingly deforms with the bending starting point portions 116 being the starting point, and the supporting main body portion 62 is displaced toward the front side. Therefore, when load from the rear side that is inputted to the supporting main body portion 62 is a predetermined value or greater, the rear surfaces and the distal end surfaces 112A of the rear side fit-together wall portions 112 slide toward the vehicle transverse direction outer side on the front surface of the rear wall portion 24 of the bumper RF 20, and finally separate from the bumper RF 20. Further, at this time, the supporting member 100 bendingly deforms with the bending starting point portions 116 being the starting point, and the supporting main body portion 62 is displaced toward the front side. Due thereto, the supporting main body portion 62 of the supporting member 100 separates from the bumper RF 20. Accordingly, the damageability with respect to the sub-radiator 94 can be improved. Due to the above, in the second embodiment as well, a collision with a collision body at the corner portion 10A of the vehicle 10 can be detected while the damageability with respect to the sub-radiator 94 is improved.

Note that the second embodiment is structured such that the supporting main body portion 62 of the supporting member 100 separates from the bumper RF 20, and not such that the entire supporting member 100 separates from the bumper RF 20. Therefore, "separates from the bumper reinforcement" in the present invention also includes a portion of the supporting member 100 separating from the bumper RF 20.

Further, in the second embodiment, as described above, the front side fit-together wall portions 110 of the supporting member 100 are fixed to the front wall portion 22 of the bumper RF 20 by the fixing bolts 120 and the fixing nuts 122. Therefore, the mounted state of the supporting member 100 can be stabilized. Due thereto, the durability and the like of the supporting member 100 with respect to vibrations and the like that arise at the time of usual traveling of the vehicle 10 for example can be improved. Accordingly, the reliability of the supporting member 100 can be improved.

Further, the bending starting point portions 116 are formed at the proximal end portions of the front side fit-together wall portions 110 of the supporting member 100, and there is a structure in which, when load of a predetermined value or greater is inputted to the supporting main body portion 62 from the rear side, the supporting member 100 bendingly deforms with the bending starting point portions 116 being the starting point, and the supporting main body portion 62 is displaced toward the front side. Therefore, even if the supporting member 100 is fixed to the bumper RF 20 by the fixing bolts 120 and the fixing nuts 122, the supporting member 100 is bendingly deformed stably, and the supporting main body portion 62 can be displaced toward the front side.

Third Embodiment

A vehicle front portion structure S3, that is equipped with the pedestrian collision detecting sensor 50 and relates to a third embodiment, is described by using FIG. 7. The third embodiment is structured similarly to the second embodiment, except for the form of a supporting member 200 and the structure of mounting the supporting member 200 to the bumper RF 20. Note that, in the following description, portions of the supporting member 200 that are structured similarly to the supporting member 100 of the second embodiment are denoted by the same reference numerals.

Namely, in the third embodiment, the supporting member 200 has the rear wall portion 102 that structures the rear surface 62B of the supporting main body portion 62, in the same way as in the second embodiment. The rear wall portion 102 connects the portion at the rear end side of the base wall portion 64 and the portion at the distal end side of the front wall portion 66, and is disposed so as to be inclined toward the front side while heading toward the vehicle transverse direction outer side as seen in plan view. Further, the supporting main body portion 62 is formed substantially in the shape of a right triangle whose vertex is the vehicle transverse direction outer side end portion as seen in plan view, and extends from the bumper RF 20 toward the vehicle transverse direction outer side. Further, in the third embodiment, the first reinforcing rib 104 and the second reinforcing rib 106 are omitted at the supporting main body portion 62.

On the other hand, the fit-together portions 72 are omitted at the mounting mechanism portion 70 of the supporting member 200, and the mounting mechanism portion 70 has fixed wall portions 202 that serve as a "fixed portions". The fixed wall portions 202 are disposed in the upper side closed cross-section 28A interior and the lower side closed cross-section 28C interior of the bumper RF 20, and project-out from the base wall portion 64 toward the vehicle transverse direction inner side along the rear surface of the front wall portion 22 of the bumper RF 20. Further, in the same way as in the second embodiment, the pair of upper and lower fixing holes 34 are formed so as to pass-through the front wall portion 22 of the bumper RF 20, and insert-through holes 202A are formed so as to pass-through the fixed wall portions 202 at positions corresponding to the fixing holes 34. Further, the fixing bolts 120 are inserted from the front side into the fixing holes 34 and the insert-through holes 202A, and the fixing nuts 122 are screwed-together with the distal end portions of the fixing bolts 120. Due thereto, the fixed wall portions 202 are fixed to the front wall portion 22 of the bumper RF 20 by the fixing bolts 120 and the fixing nuts 122.

Further, a notch 204 is formed in the proximal end portion of the fixed wall portion 202 (the boundary portion between the fixed wall portion 202 and the base wall portion 64). The notch 204 is formed in the shape of a substantially V-shaped groove that opens toward the rear side as seen in plan view, and passes-through in the vertical direction. Further, the portion, where the notch 204 is formed, at the proximal end portion of the fixed wall portion 202 is made to be a bending starting point portion 206. Moreover, in the third embodiment, the flange portion 74 and the fit-together groove portion 76 are omitted at the mounting mechanism portion 70, and the portions, that are made to abut the end surface 20B of the rear wall portion 24 of the bumper RF 20, at the base wall portion 64 are made to be the abutting portions 78. Further, in the third embodiment, there is a structure in which, when load of a predetermined value or greater is inputted from the rear side to the supporting main body portion 62, the supporting member 200 bendingly deforms with the bending starting point portions 206 being the starting point, and the supporting main body portion 62 is displaced toward the front side.

Further, when load from the front side is inputted to the supporting main body portion 62, in the same way as in the second embodiment, the supporting member 200 starts to pivot counterclockwise with the end surface 20B of the rear wall portion 24 of the bumper RF 20 being the fulcrum as seen in plan view, but pivoting of the supporting member 200 is limited by the front wall portion 22 of the bumper RF 20. Due thereto, in a collision with a collision body at the corner portion 10A of the vehicle 10, the absorber side portion 44 and the pressure tube 52 can be supported from the rear side by the supporting member 200. As a result, a collision with a collision body at the corner portion 10A of the vehicle 10 can be detected.

On the other hand, in a damage test of the vehicle 10, when the supporting member 200 is displaced toward the rear side together with the bumper RF 20, and the supporting main body portion 62 of the supporting member 200 interferes with the sub-radiator 94, load from the rear side is inputted to the supporting main body portion 62. When load from the rear side is inputted to the supporting main body portion 62, in the same way as in the second embodiment, the supporting member 200 starts to pivot clockwise with the end surface 20B of the front wall portion 22 of the bumper RF 20 being the fulcrum, as seen in plan view. At this time, the fixed wall portions 202 of the supporting member 200 start to be displaced toward the rear side, but the fixed wall portions 202 are fixed to the front wall portion 22 of the bumper RF 20 by the fixing bolts 120 and the fixing nuts 122, and therefore, displacement of the fixed wall portions 202 toward the rear side is limited.

Here, there is a structure in which, when load of a predetermined value or greater is inputted to the supporting main body portion 62 from the rear side, the supporting member 200 bendingly deforms with the bending starting point portions 206 being the starting point, and the supporting main body portion 62 is displaced toward the front side. Therefore, when load from the rear side that is inputted to the supporting main body portion 62 is a predetermined value or greater, the supporting member 200 bendingly deforms with the bending starting point portions 206 being the starting point, and the supporting main body portion 62 separates from the bumper RF 20. Accordingly, in the third embodiment as well, operation and effects that are similar to those of the second embodiment can be achieved.

Note that the second embodiment and the third embodiment are structured such that the supporting members 100, 200 are fixed to the bumper RF 20 by using the fixing bolts 120 and the fixing nuts 122 that serve as fastening members, but the fastening members are not limited to this. For example, there may be a structure in which the supporting members 100, 200 are fixed to the bumper RF 20 by using clips, grommets or the like. Further, in this case, there may be a structure in which the fastening by the fastening members is cancelled when load of a predetermined value or greater is inputted to the supporting main body portion 62 from the rear side.

Further, in the first embodiment, the engaging claw portions 80 are formed at the supporting member 60, but the engaging claw portions 80 may be omitted at the supporting member 60.

Further, in the first embodiment and the second embodiment, the mounting mechanism portion 70 of the supporting member 60, 100 has the flange portion 74 and the fit-together groove portion 76, but, in the same way as in the third embodiment, the flange portion 74 and the fit-together groove portion 76 may be omitted at the supporting member 60, 100.

Further, in the first embodiment, the concave portions 82 are formed in the fit-together portions 72 of the supporting member 60, but the concave portions 82 may be omitted at the fit-together portions 72. Namely, the fit-together portions 72 may be formed in solid shapes. Further, the plural (at five places) reinforcing ribs 68 are formed at the supporting main body portion 62 of the supporting member 60. Namely, concave portions that open toward the rear side are formed in the supporting main body portion 62 between the upper and lower reinforcing ribs 68, but the supporting main body portion 62 may be formed in a solid shape such that these concave portions are omitted.

Further, in the first embodiment and the second embodiment, the fit-together portions 72 of the supporting member 60, 100 are formed as an upper and lower pair, but the fit-together portions 72 at three places may be formed at the supporting member 60, 100. Namely, there may be a structure in which the fit-together portion 72 is further added between the pair of upper and lower fit-together portions 72, and this additional fit-together portion 72 is fit-together with the intermediate closed cross-section 28B interior of the bumper RF 20.

Further, in the third embodiment, the fixed wall portions 202 of the supporting member 200 are formed as an upper and lower pair, but the fixed wall portions 202 at three places may be formed at the supporting member 200. Namely, there may be a structure in which the fixed wall portion 202 is further added between the pair of upper and lower fixed wall portions 202, and this additional fixed wall portion 202 is disposed in the intermediate closed cross-section 28B interior of the bumper RF 20.

Further, in the first embodiment through the third embodiment, the pedestrian collision detecting sensor 50 is structured by the pressure tube 52 and the pressure sensors. Instead, the pedestrian collision detecting sensor 50 may be structured by a pressure chamber and pressure sensors that serve as "pressure sensor members". In this case, the pressure chamber may be disposed at the front side of the upper portion (the upper side closed cross-section 28A) of the bumper RF 20, and the absorber 40 may be disposed at the front side of the lower portion (the lower side closed cross-section 28C) of the bumper RF 20.

Further, in the first embodiment through the third embodiment, the sub-radiator 94 that is disposed at the rear side of the supporting member 60, 100, 200 is made to be the peripheral part, but the peripheral part is not limited to this. For example, a washer tank, that stores cleaning liquid for the windshield glass of the vehicle, may be made to be the peripheral part.

The invention claimed is:

1. A vehicle front portion structure equipped with a pedestrian collision detecting sensor, the vehicle front portion structure comprising:
   a bumper reinforcement whose length direction is a vehicle transverse direction;
   a pedestrian collision detecting sensor structured to include a pressure sensor member, that is adjacent to a vehicle front side of the bumper reinforcement and that extends in the vehicle transverse direction, wherein the pedestrian collision detecting sensor outputs a signal corresponding to a change in pressure of the pressure sensor member; and
   a supporting member that is mounted to a vehicle transverse direction outer side end portion of the bumper reinforcement, that extends from the bumper reinforcement toward a vehicle transverse direction outer side, that supports the pressure sensor member from a vehicle rear side with respect to load from a vehicle front side, and that separates from the bumper reinforcement when load of a predetermined value or greater is inputted from a vehicle rear side.

2. The vehicle front portion structure of claim 1, wherein the supporting member includes a supporting main body portion that extends toward the vehicle transverse direction outer side from the bumper reinforcement, and a mounting mechanism portion that is mounted to the vehicle transverse direction outer side end portion of the bumper reinforcement and maintains a mounted posture of the supporting main body portion, and
   when the load of the predetermined value or greater is inputted to the supporting main body portion from the vehicle rear side, maintaining of the mounted posture of the supporting main body portion by the mounting mechanism portion is cancelled, and the supporting main body portion is displaced toward the vehicle front side.

3. The vehicle front portion structure of claim 2, wherein the bumper reinforcement is formed in a hollow shape that opens toward the vehicle transverse direction outer side,
   the mounting mechanism portion includes a fit-together portion that is fit-together with an interior of the bumper reinforcement, and
   a fit-together length of the fit-together portion and a rear wall portion of the bumper reinforcement is set to be short as compared with a fit-together length of the fit-together portion and a front wall portion of the bumper reinforcement.

4. The vehicle front portion structure of claim 3, wherein the fit-together portion is fixed by a fastening member to the front wall portion of the bumper reinforcement, and
   the supporting member bendingly deforms when the load of the predetermined value or greater is inputted to the supporting main body portion from the vehicle rear side.

5. The vehicle front portion structure of claim 4, wherein a bending starting point portion that is a starting point of bending deformation is formed at the fit-together portion.

6. The vehicle front portion structure of claim 2, wherein the mounting mechanism portion includes a groove portion that opens toward a vehicle transverse direction inner side as seen in plan view, and a rear wall portion of the bumper reinforcement is fit-into an interior of the groove portion.

7. The vehicle front portion structure of claim 3, wherein an engaging portion, that is engaged with an engaged portion formed at the bumper reinforcement, is provided at the supporting member, and
   movement of the supporting member toward the vehicle transverse direction outer side is limited due to the engaging portion being engaged with the engaged portion.

8. The vehicle front portion structure of claim 2, wherein the bumper reinforcement is formed in a hollow shape that opens toward the vehicle transverse direction outer side,
   the mounting mechanism portion is structured to include an abutting portion, that is structured so as to be able to abut a vehicle transverse direction outer side end surface at a rear wall portion of the bumper reinforcement, and a fixed portion, that is fixed by a fastening member to a front wall portion of the bumper reinforcement at an interior of the bumper reinforcement, and
   the supporting member bendingly deforms when the load of the predetermined value or greater is inputted to the supporting main body portion from the vehicle rear side.

9. The vehicle front portion structure of claim 8, wherein a bending starting point portion that is a starting point of bending deformation is formed at the fixed portion.

10. The vehicle front portion structure of claim 2, wherein a width dimension, in a vehicle longitudinal direction, of the supporting main body portion is set so as to become smaller toward the vehicle transverse direction outer side.

11. The vehicle front portion structure of claim 2, wherein a recessed portion that opens toward the vehicle rear side as seen in plan view is formed at a rear surface of the supporting main body portion.

12. The vehicle front portion structure of claim 2, wherein a reinforcing rib, that increases a bending rigidity of the supporting main body portion in a vehicle longitudinal direction, is formed at the supporting main body portion.

* * * * *